United States Patent
Tufari

(10) Patent No.: US 10,243,340 B2
(45) Date of Patent: *Mar. 26, 2019

(54) SPACE DAMPERS FOR FOUR-CONDUCTORS BUNDLES

(71) Applicant: A. Salvi & C. S.P.A., Milan (IT)

(72) Inventor: Aldo Tufari, Milan (IT)

(73) Assignee: A. Salvi & C. S.p.A., Milan (IT)

( * ) Notice: Subject to any disclaimer, the term of this patent is extended or adjusted under 35 U.S.C. 154(b) by 0 days.

This patent is subject to a terminal disclaimer.

(21) Appl. No.: 15/593,389

(22) Filed: May 12, 2017

(65) Prior Publication Data

US 2018/0006443 A1    Jan. 4, 2018

Related U.S. Application Data

(63) Continuation of application No. 14/369,688, filed on Jun. 28, 2014, now Pat. No. 9,685,771.

(51) Int. Cl.
  *H02G 7/12*  (2006.01)
  *H02G 7/05*  (2006.01)
  *H02G 7/14*  (2006.01)

(52) U.S. Cl.
  CPC ............ *H02G 7/125* (2013.01); *H02G 7/053* (2013.01); *H02G 7/12* (2013.01); *H02G 7/14* (2013.01)

(58) Field of Classification Search
  None
  See application file for complete search history.

(56) References Cited

U.S. PATENT DOCUMENTS 3,925,594 A     12/1975    Rawlins
4,242,537 A  *  12/1980    Hearnshaw ............ H02G 7/125
                                                  174/146
4,554,403 A     11/1985    Hearnshaw

FOREIGN PATENT DOCUMENTS

EP            0 244 624 A1    11/1987

* cited by examiner

*Primary Examiner* — Dimary S Lopez Cruz
(74) *Attorney, Agent, or Firm* — Bay State IP, LLC

(57) ABSTRACT

A space damper for 4-cable bundles of overhead power transmission lines is disclosed, comprising a framework (10) where—from four support arms (20a-20b) depart, at the distal ends of which there are provided clamps for fastening electric cables, said arms (20a-20c) being constrained to the framework (10) through respective dampening hinges (30a-30c), wherein the spacer damper is configured so that the vertical, natural-mode frequencies thereof are higher than the corresponding horizontal, natural-mode frequencies thereof.

4 Claims, 4 Drawing Sheets

SPACE DAMPERS FOR FOUR-CONDUCTORS BUNDLES

CROSS REFERENCE TO RELATED APPLICATION

This application is a Continuation application and claims the benefit of and takes priority from U.S. patent application Ser. No. 14/369,688 filed on Jun. 28, 2014, which in turn claims the benefit of and takes priority from International Application No. PCT/IT2011/000424 having an international filing date of Dec. 30, 2011, and from which priority is claimed under all applicable sections of Title 35 of the United States Code.

FIELD OF THE INVENTION

The present invention refers to a spacer for electric bundle conductors for overhead transmission lines, in particular a spacer for 4-cable bundles.

BACKGROUND OF THE ART

As known, overhead electric lines represent by far the most widely used type of long-distance power line. They comprise a plurality of conductors stretching between support poles. Normally, especially for higher-voltage long-distance power lines, each line conductor consists of a bundle of cables or basic conductors, because that enables to increase transmissible limiting power, leakage and electromagnetic disturbance fields. The most used bundles consist of two, three or four basic commonly cables.

Evidently, the individual bundle conductors must be kept at the correct distance one from the other, preferably across the entire span between one support pole and the other. For such purpose, it is known to resort to spacers, constructed in various ways depending on the number of conductors making up the bundle. In the present specification, spacers for 4-cable bundles will be dealt with, i.e. spacers suited to maintain a position coherence between four cables belonging to a bundle of a conductor.

In static conditions, few spacers located across the length of the span (varying between 200 and 1000 meters long) are theoretically sufficient to keep the cables at the correct mutual distance, defining a series of wide subspans. However, the overhead transmission lines are exposed to varying atmospheric conditions which change the condition thereof and introduce external disturbance forces: typically, wind acts significantly on overhead transmission lines, affecting the dynamic behaviour thereof.

The wind action introduces three types of oscillations/vibrations on overhead transmission lines. Aeolian vibrations, due to whirl detachment, normally manifest at high frequency and low amplitude. Another oscillation mode is the one referred to as "galloping" which originates—with low frequency and high amplitude—within the same span (i.e. between two support poles) and leads to the cable bundles oscillating in the vertical plane. The galloping occurs in highly specific environmental conditions (typically when there is an ice deposit around the cables). Finally there are subspan oscillations, which manifest within the individual subspan mutually separated by the spacers and are due to an aerodynamic interaction (wake effect) between the windward cables and the leeward ones.

In the following it will be substantially dealt with subspan oscillations. This phenomenon proved particularly evident on 4-cable bundles, where typical conditions exist where finds himself having a pair of windward cables and a pair of leeward cables, which produce important wake effects. These oscillations, also referred to as 'subspan', may lead to collisions between the bundle sub-conductors with remarkable stresses on the conductors, at the spacer damper clamps, and with the possible resulting cable breakage.

All the 4-cable spacer dampers suggested so far in the prior art provide a central quadrilateral framework, at the vertexes of which there are arranged fastening means, supported by respective small arms, at the ends of which the cables of the conductive bundle are tightened. Typically the structure is symmetrical, so as to maintain the four cables at the vertexes of a quadrilateral, mutually well-spaced apart and with an equally distributed static load. In order to face subspan oscillations, over time various devices have been suggested.

Traditionally, the cable-fastening arms are mounted on the quadrilateral framework through dampening hinges, which already introduces a dampening effect on oscillations/vibrations. Spacer dampers of this type are described, for example, in EP0244624, U.S. Pat. Nos. 4,554,403 and 4,188,502.

Also in FIG. 1 herewith enclosed there is shown, in elevation front view, a spaces damper of the prior art. As can be noticed, the spacer damper consists of a quadrilateral framework 1, at the vertexes of which four identical arms 2a-2c are hinged, at the distal ends of which there are fastened, with known-type clamps, the conductive cables (not shown). Each hinge 3a-3c constraining framework 1 to arms 2a-2c has a configuration suited to support the clamps in the desired position and to dampen any oscillations. In particular, as can be noticed in FIG. 1, the clamps are supported so that the cables are virtually at the same height as the centre of rotation of hinges 3a-3c (i.e. the fastening point of the cable and the rotation axis of the hinge are on a substantially horizontal line). This design is considered the most suitable in this sector because, in addition to producing a symmetrical load of the stresses, it is the one which allows to face best aeolian vibrations. As a matter of fact, said aeolian vibrations are triggered typically in the vertical plane (coinciding with the axis of FIG. 1) and hence it is useful that they find a good lever arm defined by arms 2a-2c with respect to the axes of rotation of hinges 3a-2c so that the dampening system operates adequately. FIG. 2 shows a geometric diagram by which the space damper of FIG. 1 is schematised for numerical dynamic simulations. As can be detected, the nearly horizontal attitude of the arms and the need to space the cables apart as far as possible makes the central framework substantially rectangular and of significant size (the height thereof is nearly identical to the vertical distance between the cables).

Another effective measure is certainly that of increasing the number of the spacer dampers on the transmission line, in order to reduce the extension of subspans and hence improve the behaviour of the bundle upon aerodynamic forces. When the conductive cables are particularly light and the weather conditions are particularly severe (high temperatures, reduced tension on the cables and frequent and intense winds), the subspan oscillation is a predominant problem and it may be necessary to shorten the subspans down to about 40-45 meters. This is particularly undesired—as may be guessed—because it affects costs, both of the material' and of installation and maintenance.

Alternatively or additionally, it has been suggested to apply to the subspan line suitable dampening devices, provided with counterweight, which act especially on torsional normal modes. This solution, however, affects costs, too.

SUMMARY OF THE INVENTION

The object of the present invention is hence to provide an innovative spacer damper which solves the above-mentioned problem, i.e. that of reducing as far as possible subspan oscillations, without forcing to reduce subspan extension.

This object is achieved with a device as defined, in essential terms, in the claim 1 herewith enclosed. The dependent claims describe preferred features of the invention.

In particular, according to a first aspect of the invention a spacer damper for 4-cable bundles of overhead power transmission lines is provided, comprising a framework wherefrom four small support arms depart at the distal ends of which there are provided clamps for fastening electric cables, said small arms being constrained to the framework through respective dampening hinges, wherein said spacer damper is configured so that the vertical-mode natural frequencies thereof are higher than corresponding horizontal-mode natural frequencies thereof.

According to a further aspect, a spacer damper is provided wherein the small arms have reference axes, which join the fastening point of the respective cables with the centre of rotation of the respective hinges, which form angles with the horizontal axis, two of said angles being identical and different from the other two.

According to another aspect, the dampening hinges are at the vertexes of a quadrilateral framework which has at least one side inclined with respect to a horizontal line. Moreover, according to a last aspect of the invention, the quadrilateral framework has non-orthogonal adjacent sides.

BRIEF DESCRIPTION OF THE DRAWINGS

Further features and advantages of the invention become in any case more evident from the following detailed description of a preferred embodiment, given purely by way of a non-limiting example and illustrated in the attached drawings, wherein.

DETAILED DESCRIPTION OF PREFERRED EMBODIMENTS

The inventor started off from the consideration that, although aeolian vibrations are by far the most frequent ones, on the 4-cable bundles—where the phenomenon of subspan oscillations is equally important—it could be advantageous to move away from the consolidated approach and try to identify a compromise solution, renouncing part of the effectiveness against aeolian vibrations.

Starting from this approach, the inventor could realise that subspan oscillations are referable to an instability phenomenon at two degrees of freedom of the mechanical structure subject to aerodynamic forces (flutter). In particular, the instability is due to the coupling of a subspan horizontal oscillation natural mode with a vertical subspan oscillation natural mode (which may possibly derive from a torsional mode of the entire span).

Figure 1:
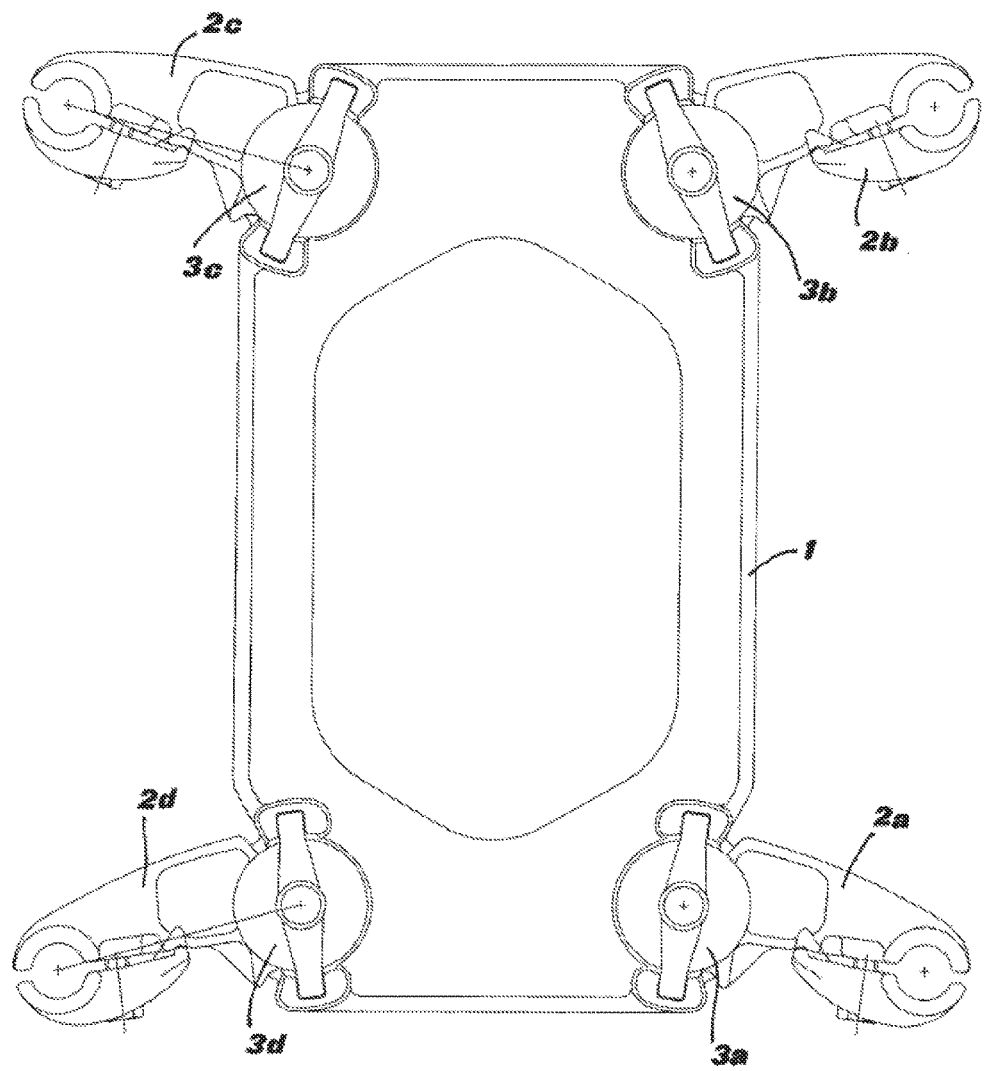
FIGS. 1 and 2, as already mentioned, represent an elevation view and a schematic view, respectively, of a prior-art, 4-cable bundle spacer damper.
Figure 2:
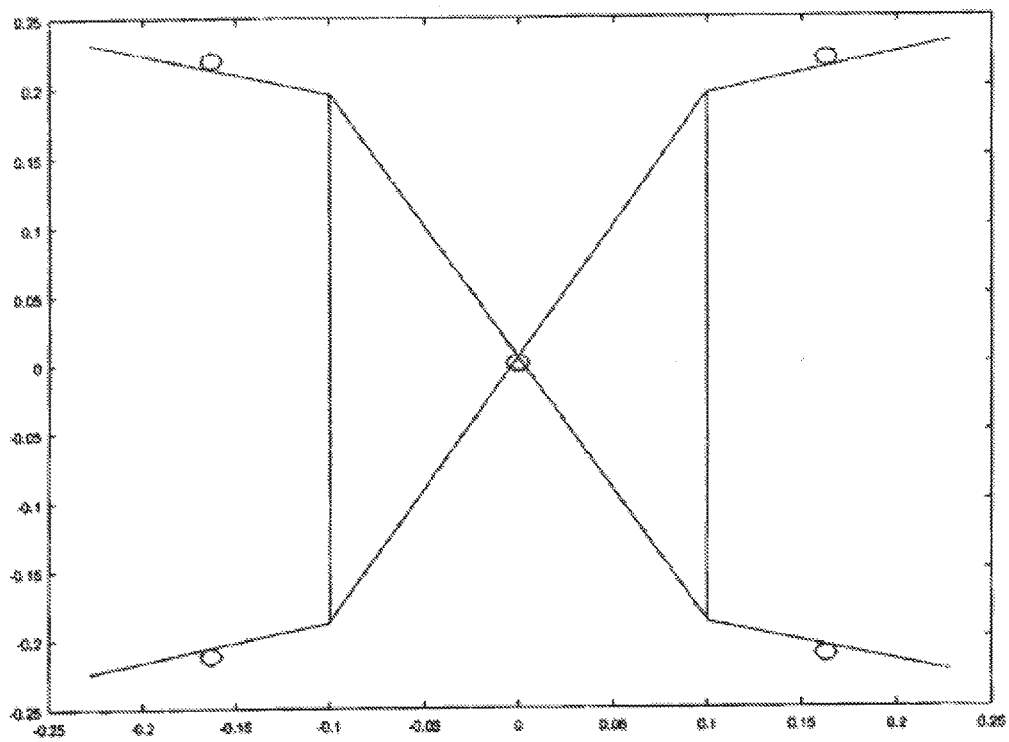

The frequencies of the two natural modes are structurally different. In particular, by the known configuration of the symmetrical 4-cable bundle spacer dampers and with identically oriented arms (as in the solution of FIGS. 1 and 2), the frequency of the vertical mode is lower than that of the horizontal mode.

It has been realised that the non-conservative force field due to the aerodynamic wake effect—of the windward conductor over the leeward one, typically in the horizontal plane progressively changes the frequencies of the vertical modes, increasing them and making them the same as the ones of the corresponding horizontal modes. When the frequencies of a pair of modes match, the typical instability form sets in (flutter), with elliptical motion of the two bundle cables which expands up to a limit cycle which can cause the cables to collide against each other or even to breakage.

According to the invention, by abandoning the consolidated approach of a symmetrical structure, a spacer damper is provided with such a configuration that the vertical-mode frequencies thereof are higher, even by a small measure, than the frequencies of the corresponding horizontal modes. In such case, the effect of the aerodynamic forces tends to move further away such frequencies, hence avoiding the two modes from coupling originating subspan oscillations.

Figure 3:
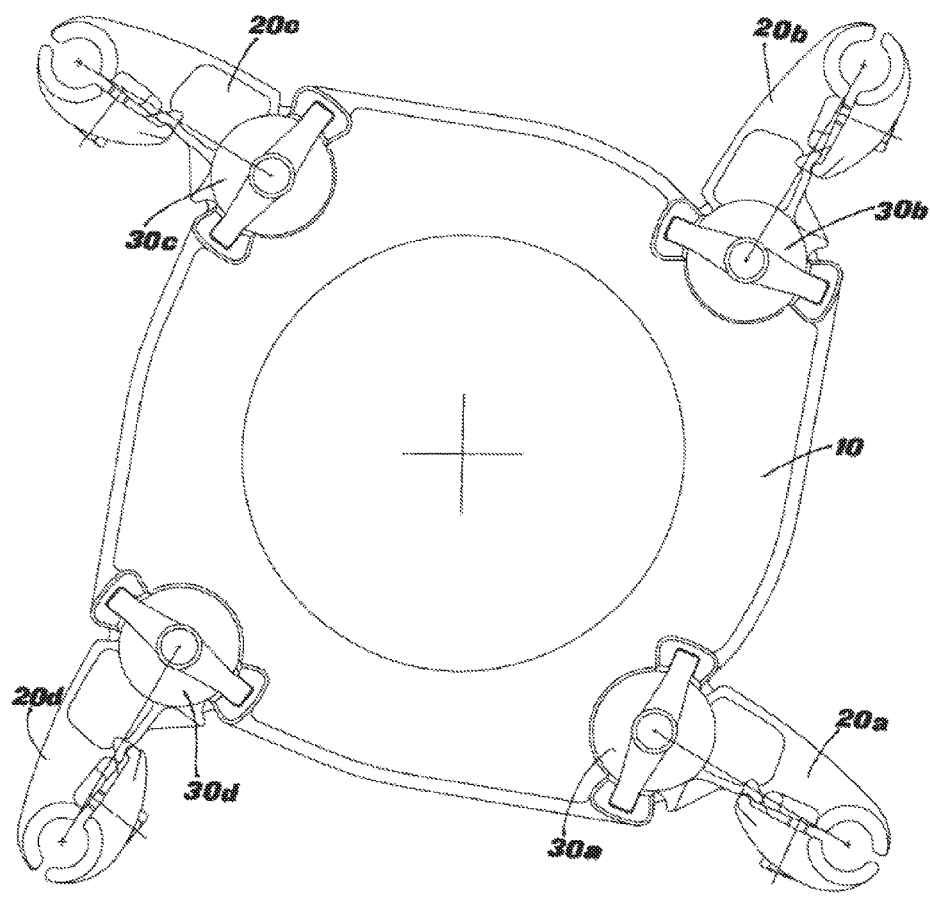
FIG. 3 is an elevation front view of an embodiment of a spacer damper according to the invention.

FIG. 3 shows a possible embodiment of a 4-cable bundle spacer damper which obeys the above set forth inventive principle. It consists, in a way known per se, of a framework 10 provided with four peripheral support arms 20a-20c which bear, at the distal ends thereof, tightening clamps for four corresponding conductive cables (not shown). Support arms 20a-20c are constrained to framework 10 through dampening hinges 30a-30b.

Figure 4:
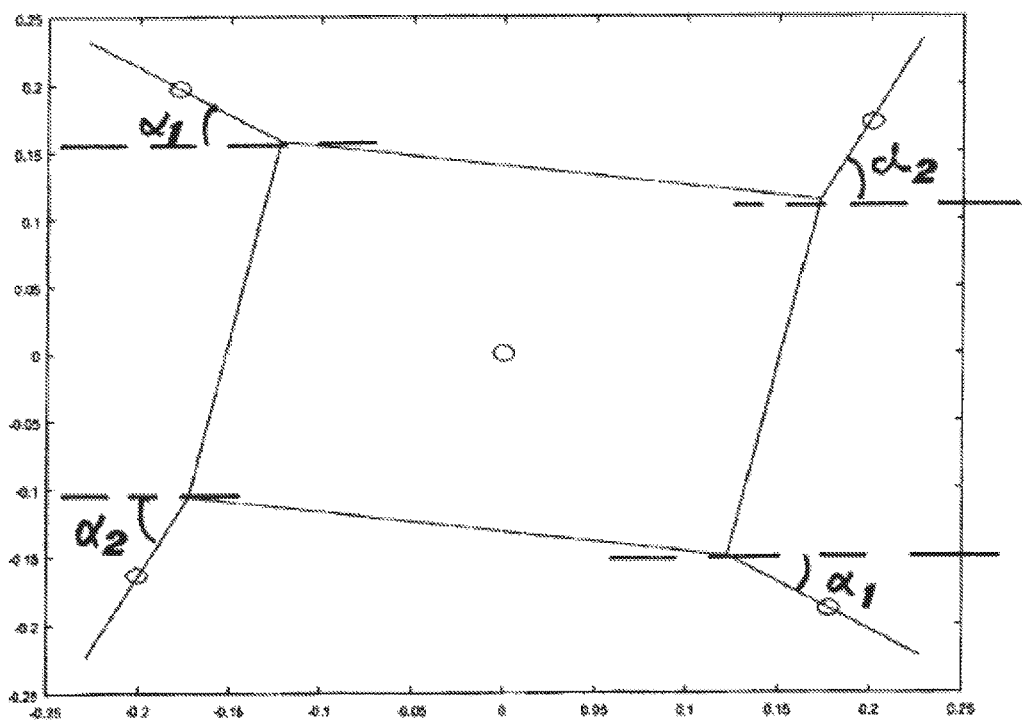
FIG. 4 represents a geometric diagram by which the spacer damper of FIG. 3 is schematized, for the purpose of a numeric dynamic simulation.

According to the invention, the spacer damper is no longer configured in a symmetrical way, although the cables are nevertheless kept at the four vertexes of an ideal rectangular quadrilateral with horizontal and vertical sides. In particular, the four hinges 30a-30b are at the four vertexes of a quadrilateral having at least one side inclined with respect to a horizontal line (FIG. 3) an can also have non-orthogonal adjacent sides, such as for example a parallelogram (FIG. 4).

Moreover, support arms 20a-20b have reference axes (i.e. the axis which connects the cable-fastening point with the rotation axis of the respective hinge 30a-30b) which have different angles with respect to a horizontal axis. FIG. 4 shows a case wherein the reference axes of the support arms have inclination angles with respect to the horizontal which are identical in pairs, i.e. two opposite arms define an angle $a_1$ with respect to the horizontal, while the other two opposite arms define a reference angle $a_2$ different from $a_1$. These angles range between 35 and 65 degrees, preferably with $a_1$ between 30 and 40 degrees and $a_2$ between 60 and 70 degrees.

By this configuration an excellent average performance of the spacer damper is obtained with respect to typical oscillations. As a matter of fact, it produces lower horizontal natural mode frequencies than the frequencies of the corresponding vertical natural modes, hence strongly inhibiting the development of subspan oscillations, at the price of a slight worsening over aeolian vibrations, which, however, remain within acceptable limits.

The excellent performance of the spacer damper according to the invention has been proved at a theoretical level through numerical simulation. It has been detected that a space damper according to the invention allows to dramatically extend the length of subspans also in critical environmental conditions, up to by 60 meters, without significant worsening effects in the performance being noticeable in relation to wind vibrations.

The construction according to the invention allows, among other things, to define a central framework of a smaller size compared to the prior art, which may further reduce the relative costs.

However, it is understood that the invention is not limited to the specific configurations described above and illustrated, which represent only non-limiting examples of the scope of the invention, but that a number of variants are possible, all within the reach of a person skilled in the field, without departing from the scope of the invention.

The invention claimed is:

1. A spacer damper for 4-cable bundles of overhead power transmission lines, comprising an integral quadrilateral framework (10) wherefrom four support arms (20a-20b) depart, wherein one distal end of each of said four support arms is provided with a clamp for fastening an electric cable, each of said four support arms (20a-20c) being constrained to said integral framework (10) at another distal end of each of said four support arms through respective dampening hinges (30a-30c); wherein said spacer damper is configured not symmetrical, said each electric cable being nevertheless kept at each of the four vertexes of an ideal rectangular quadrilateral with horizontal and vertical sides;

and said dampening hinges (30a-30b) are at vertexes of the integral quadrilateral framework having at least one side of the horizontal and vertical sides inclined with respect to a horizontal line;

so that the vertical, natural-mode frequencies of the spacer damper are higher than the corresponding horizontal, natural-mode frequencies thereof.

2. The spacer damper as claimed in claim 1, wherein each of said arms (20a-20c) have reference axis, which join the fastening point of the respective electric cable with the centre of rotation of the respective dampening hinges (30a-30c), said reference axis which have different angles ($\alpha 1$, $\alpha 2$) with respect to a horizontal axis.

3. The spacer damper as claimed in claim 2 wherein said reference axis form first and second different angles ($\alpha 1$, $\alpha 2$) with the horizontal axis which are identical in pairs and mutually different.

4. The spacer damper as claimed in claim 3, wherein said first and second different angles range between 35 and 65 degrees, preferably with the first angle $\alpha 1$ between 30 and 40 degrees and the second angle $\alpha 2$ between 60 and 70 degrees.

* * * * *